US011141844B1

(12) United States Patent
Greer et al.

(10) Patent No.: US 11,141,844 B1
(45) Date of Patent: Oct. 12, 2021

(54) MOTORCYCLE BASE VALVE PRESS AND RELATED METHODS

(71) Applicant: Gadget Theory, LLC, Phoenix, AZ (US)

(72) Inventors: Mark Greer, Phoenix, AZ (US); Joseph Cowin, Phoenix, AZ (US)

(73) Assignee: Gadget Theory LLC, Phoenix, AZ (US)

( * ) Notice: Subject to any disclaimer, the term of this patent is extended or adjusted under 35 U.S.C. 154(b) by 843 days.

(21) Appl. No.: 15/812,722

(22) Filed: Nov. 14, 2017

(51) Int. Cl.

| | |
|---|---|
| ***B23P 19/04*** | (2006.01) |
| ***B25B 27/26*** | (2006.01) |
| ***B30B 1/18*** | (2006.01) |
| ***B25B 27/02*** | (2006.01) |

(52) U.S. Cl.
CPC ............ *B25B 27/26* (2013.01); *B25B 27/023* (2013.01); *B30B 1/18* (2013.01)

(58) Field of Classification Search
CPC .......... B25B 27/26; B25B 27/023; B30B 1/18
USPC ........................ 29/217, 213.1, 214, 215, 278
See application file for complete search history.

(56) References Cited

U.S. PATENT DOCUMENTS 2,051,447 A * 8/1936 Johansen .............. B30B 15/041 83/635
5,052,208 A * 10/1991 Sartorio ................. B21D 28/00 72/407
10,456,824 B2 * 10/2019 Janiszewski ............ F16P 3/001
2008/0295709 A1 * 12/2008 Rapp ..................... B30B 15/041 100/245
2014/0137406 A1 * 5/2014 Firzlaff ................... B25B 27/06 29/888.061

* cited by examiner

*Primary Examiner* — Orlando E Aviles
*Assistant Examiner* — Shantese L. McDonald
(74) *Attorney, Agent, or Firm* — Adam R. Stephenson, LTD

(57) ABSTRACT

Implementations of motorcycle base valve presses may include: a press including a base coupled to a first end of a body, a head coupled to a second end of the body, a handle coupled to a side of the head, and a press ram coupled through the head. The motorcycle base valve press may also include an end cap coupled with a first end of the press ram; and a motorcycle fork receiver coupled to the base of the press, the motorcycle fork receiver configured to receive a damper assembly of a motorcycle fork. The end cap may be configured to contact the base valve through the press ram and allow the base valve to turn.

20 Claims, 7 Drawing Sheets

MOTORCYCLE BASE VALVE PRESS AND RELATED METHODS

BACKGROUND

1. Technical Field

Aspects of this document relate generally to presses, such as arbor presses for press fit work. More specific implementations involve presses for assembling devices.

2. Background

Conventionally, to assemble motorcycle suspension forks, the parts are put together by hand in several steps. The base valve of a motorcycle fork is typically pressed down by hand to engage the threads on the base valve with corresponding threads of a damper assembly of the fork, permitting the fluid and spring in the fork to be retained therein during operation.

SUMMARY

Implementations of motorcycle base valve presses may include: a press including a base coupled to a first end of a body, a head coupled to a second end of the body, a handle coupled to a side of the head, and a press ram coupled through the head. The motorcycle base valve press may also include an end cap coupled with a first end of the press ram; and a motorcycle fork receiver coupled to the base of the press, where the motorcycle fork receiver may be configured to receive a damper assembly of a motorcycle fork. The end cap may be configured to contact a base valve of the damper assembly through the press ram and allow the base valve to turn.

Implementations of motorcycle base valve presses may include one, all, or any of the following:

Motorcycle base valve presses may further include a thrust bearing coupled between the press ram and the end cap.

The thrust bearing may be configured to allow the end cap to turn with the base valve using a wrench.

The base may be configured to couple to one of a workbench or a wall.

The motorcycle fork receiver may be configured to tighten around a damper assembly.

The press ram may be configured to move vertically in relation to the head of the press.

Implementations of motorcycle base valve presses may include: a press including a base coupled to a first end of a body, a head coupled to a second end of the body, a handle coupled to a side of the head, and a press ram coupled through the head. The motorcycle base valve presses may also include an end cap coupled with a first end of the press ram, a thrust bearing coupled between the press ram and the end cap, and a motorcycle fork receiver coupled to a base of the press. The end cap may be configured to contact the base valve of a motorcycle fork and allow the base valve to turn.

Implementations of motorcycle base valve presses may include one, all, or any of the following:

The thrust bearing may be configured to allow the end cap to turn with the base valve using a wrench.

The base may be configured to couple to one of a workbench or a wall.

The motorcycle fork receiver may be configured to tighten around a damper assembly.

The press ram may be configured to move vertically in relation to the head of the press.

Implementations of methods for coupling a base valve into a damper assembly using a motorcycle base valve press may include: providing a press including: a base coupled to a first end of a body, a head coupled to a second end of the body, a handle coupled to a side of the head, and a press ram coupled through the head. The press may also include an end cap coupled with a first end of the press ram, and a motorcycle fork receiver coupled to a base of the press. The method may also include inserting a damper assembly into the motorcycle fork receiver. The damper assembly may be coupled with a base valve of a motorcycle fork. The method may include placing a base valve removal tool on a top of the base valve and placing a wrench around the base valve removal tool. The press ram may be used to bias the base valve into the damper assembly. The method may also include rotating the base valve using the wrench engaged around the base valve removal tool to tighten the base valve into the damper assembly a desired distance, releasing the bias of the press ram, and removing the damper assembly from the press.

Implementations of a method of coupling a base valve into a damper assembly using a motorcycle base valve presses may include one, all, or any of the following:

The method may further include tightening the motorcycle fork receiver around the damper assembly wherein the damper assembly is prevented from turning.

The method may further include adjusting the motorcycle fork receiver by centering the ram and end cap over the base valve and the damper assembly.

The method may further include aligning a plurality of threads on the base valve with a plurality of threads of the damper assembly.

The press may further include a thrust bearing coupled between the press ram and the end cap.

The thrust bearing may be configured to allow the end cap to turn with the base valve.

The base may be configured to couple to one of a workbench or a wall.

The motorcycle fork receiver may be configured to tighten around a damper assembly.

The press ram may be configured to move vertically in relation to the head of the press.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

Figure 1:
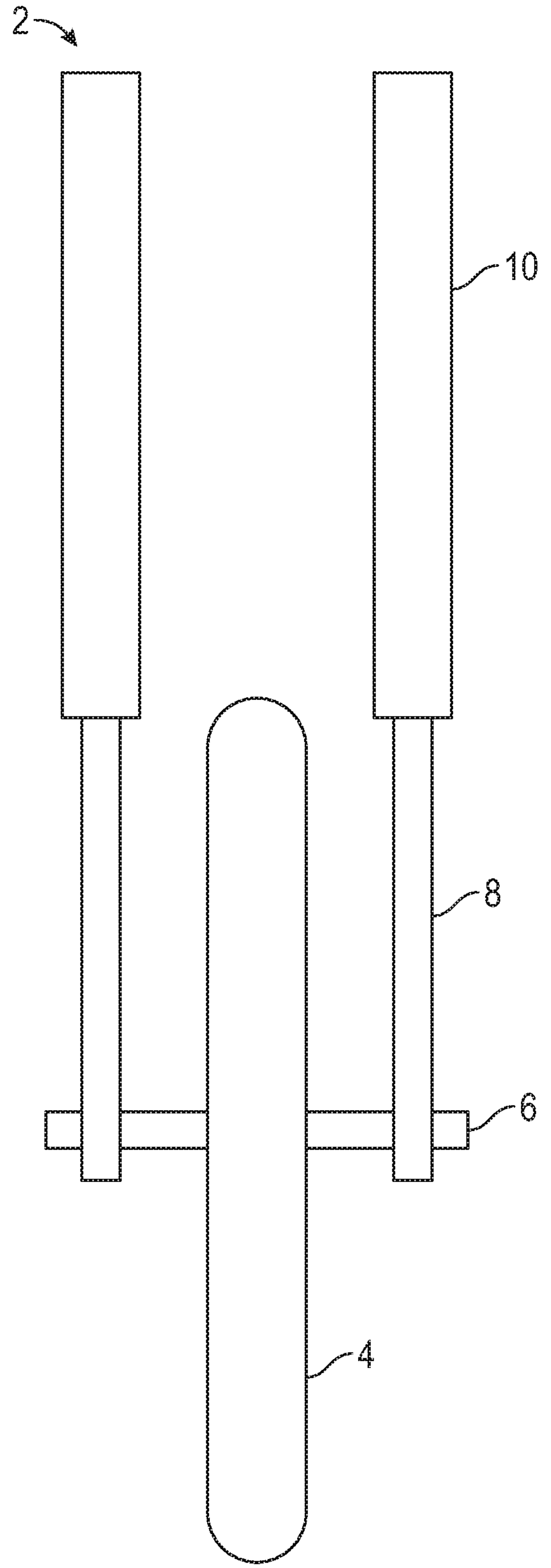
FIG. 1 is a break apart view of a front view of a motorcycle fork.

This disclosure, its aspects and implementations, are not limited to the specific components, assembly procedures or method elements disclosed herein. Many additional components, assembly procedures and/or method elements known in the art consistent with the intended motorcycle base valve press will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such motorcycle base valve press, and implementing components and methods, consistent with the intended operation and methods.

The front wheel of a motorcycle is usually linked to the motorcycle frame by a pair of forks which form part of the shock absorption component of the suspension. In some implementations, only one fork is used, but in most suspension designs, two forks are usually employed. These forks forming part of the front suspension usually include springs therein and also chambers filled with fork oil. The combination of the springs and the fork oil act as shock absorbers to protect the motorcycle and rider from bumps and vibrations as the motorcycle travels uneven surfaces. A common form of fork is a telescopic fork which uses fork tubes that contain the suspension components, coil or air springs and damper, internally. This design may be simple, inexpensive to manufacture, and relatively light compared to designs based on external components and linkage systems.

The systems that rely on using fork oil as a damper often use a damper assembly as a means of providing regressive damping and are often referred to as cartridge-style forks. The damper assembly in a cartridge-style front fork system, in turn, uses a base valve to regulate oil flow within the damper assembly as the forks experience shocks. The use of the cartridge-style front fork system allows the fork operation to dynamically adjust to conditions providing low resistance when appropriate and stiffer resistance when necessary through flow of the fork oil.

The cartridge-style front fork system creates two chambers that contain fork oil. The outer chamber is formed between the fork tubes and the damper assembly, and the inner chamber is formed between the damper assembly and the base valve. The fork oil in these chambers must be replaced occasionally along with any broken or worn parts to ensure proper fork function. In order to perform this servicing, the fork is disassembled by removing the damper assembly from the fork tubes and removing the base valve from the damper assembly.

After servicing the base valve and replacing the fork oil in the damper assembly (i.e., the inner chamber), the base valve is reinstalled in the damper assembly. To reinstall the base valve in the damper assembly, the base valve is forced into the damper assembly in order to align its threads with the interior threads of the damper assembly. Once the threads are properly aligned, the base valve is turned to engage the threads of each component with one another. Once the threads are engaged, the turning of the base valve continues until tight. Once tight, the reinstallation of the base valve into the damper assembly is complete and the damper assembly can be reinstalled into the fork tubes.

Pressing the base valve into the damper assembly while simultaneously aligning the threads and turning the base valve relative to the damper assembly can be difficult, time-consuming, and frustrating for the mechanic or technician working on the fork. This is because trying to press down hard enough to compress the base valve into the fork to cause the forks to engage while still being able to turn the base valve requires a significant amount of force yet precision operation.

Referring to FIG. 1, an implementation of a motorcycle fork 2 is illustrated coupled with a front wheel 4 and front axle 6 of a motorcycle. The motorcycle fork 2 is a key part of the suspension which protects the rider from bumps and vibrations as the motorcycle travels uneven surfaces. The fork 2 may work by controlling the resistance and speed with which the inner fork tube 8 slides into the outer fork tube 10 called compression damping. The fork 2 also works by operating to control the speed with which the inner fork tube 8 returns to its original position, a technique called rebound damping.

Figure 2:
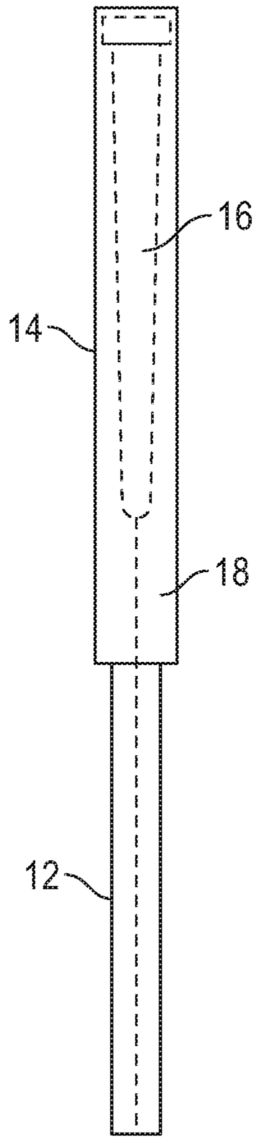
FIG. 2 is a see-through view of an inner motorcycle fork tube and an outer motorcycle fork tube containing a damper assembly.

Referring to FIG. 2, an inner fork tube 12 and an outer fork tube 14 containing a damper assembly 16 are illustrated. The damper assembly 16 provides much of the damping function of the fork. The space between the damper assembly and the inside of the inner fork tube 12 and the outer fork tube 14 is called an outer fork chamber 18. The outer fork chamber 18 is partially filled with fork oil which also provides part of the damping function of the fork as the fork oil flows around the interior components of the fork during compression of the fork.

Figure 3:
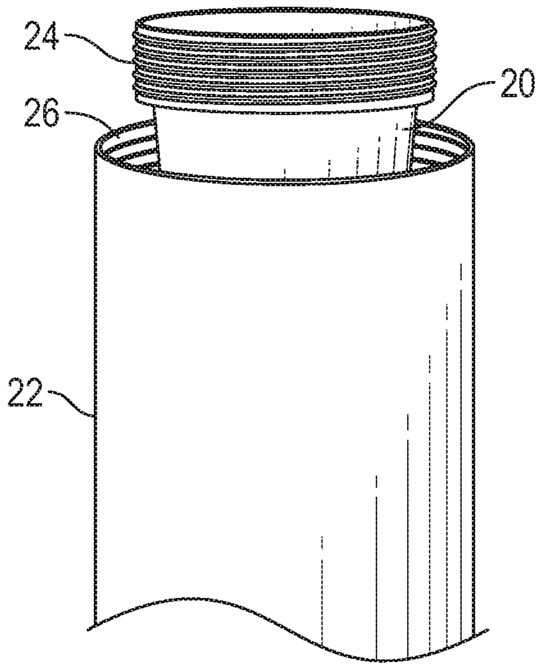
FIG. 3 is a side view of a damper assembly inside an outer motorcycle fork tube.

Referring to FIG. 3, the damper assembly 20 is secured to the outer fork tube 22 by engaging the damper assembly's outside threads 24 with the outer fork tube's inner threads 26 and turning the damper assembly inwards until it is properly tightened. The damper assembly 20 is removed from the outer fork 22 by turning the damper assembly 20 in the reverse direction to loosen it from the outer fork tube 22. Removing the damper assembly 20 from the outer fork tube 22 allows the damper assembly 20 to be serviced and the fork oil in the outer fork chamber to be replaced.

Figure 4:
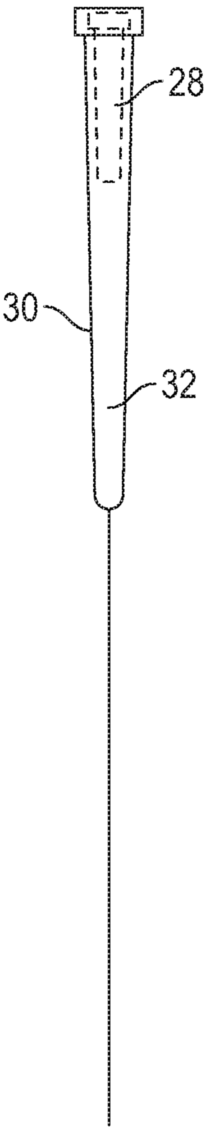
FIG. 4 is a see through view of a base valve inside a damper assembly of a motorcycle fork.

Referring to FIG. 4, a base valve 28 of a motorcycle contained inside the damper assembly 30 is illustrated. The base valve 28 is a critical component of the damping function of the damper assembly 30. Between the inside of the damper assembly 30 and the outside of the base valve 28 is the inner fork chamber 32. The inner fork chamber 32 is partially filled with fork oil which is also forms an important component of the damping function of the damper assembly 30.

The base valve 28 contains orifices that the fork oil in the inner fork chamber 32 is forced through when the fork is compressed and when it rebounds to its original position. By controlling how easily the fork oil flows through these orifices (by non-limiting example, through the size and/or arrangement of the orifices, the viscosity of the fork oil, etc.), the base valve 28 provides part of the damping function of the damper assembly 30.

Figure 5:
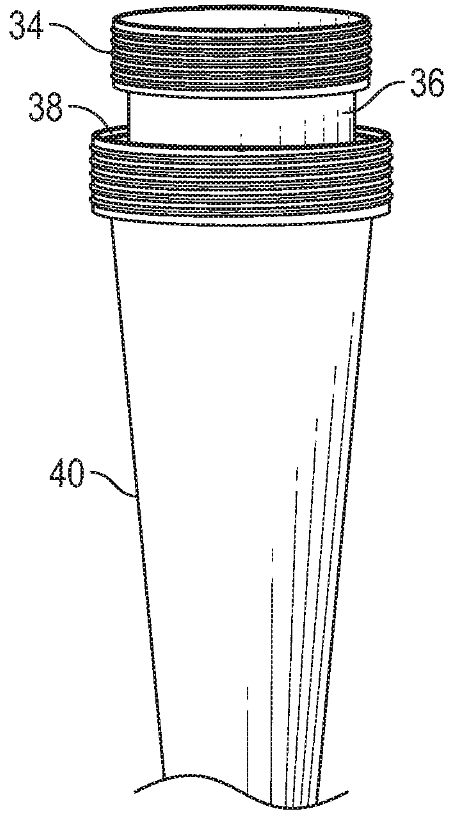
FIG. 5 is side view of a base valve inside a damper assembly of a motorcycle fork.

Referring to FIG. 5, the outer threads 34 of the base valve 36 and the inner threads 38 of the damper assembly 40 are illustrated. The outer threads 34 of the base valve 36 secure the base valve 36 to the damper assembly 40 by engaging the outside threads 34 of the base valve with the inner threads 38 of the damper assembly 40 and turning the base valve 36 until it is properly tightened. The base valve 36 may be removed from the damper assembly 40 by turning the base valve 36 in the reverse direction from the tightening direction to release it from the damper assembly 40. Removing the base valve 36 from the damper assembly 40 allows the base valve 36 to be serviced and the fork oil in the inner fork chamber to be changed.

Figure 6:
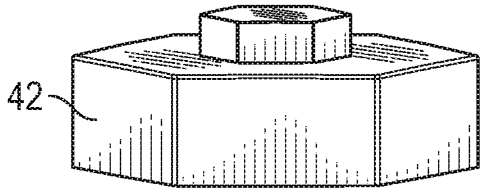
FIG. 6 is a side view of an implementation of a base valve removal tool.

Referring to FIG. 6, a base valve removal tool 42 is illustrated. In various implementations, the base valve removal tool may be dimensioned to be specific to the brand of the motorcycle base valve. In other implementations, the base valve removal tool may also be a universal tool for many brands of motorcycle base valves. In other implementations, another tool other than a wrench designed to engage with the base valve removal tool to turn the base valve may be used, such as by non-limiting example, vise grips, clamps, a bar that engages in an opening in the base valve removal tool, and any other device capable of rotating the base valve removal tool.

Figure 7:
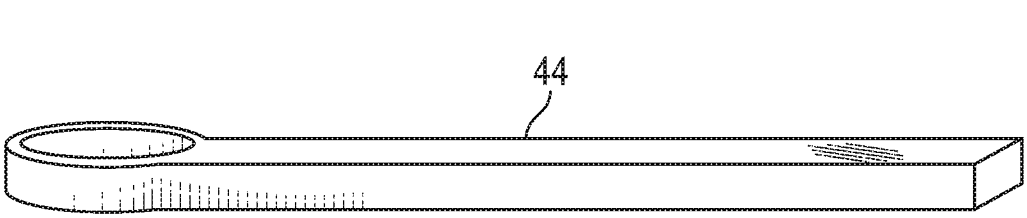
FIG. 7 is a side view of an implementation of a wrench.
Figure 8:
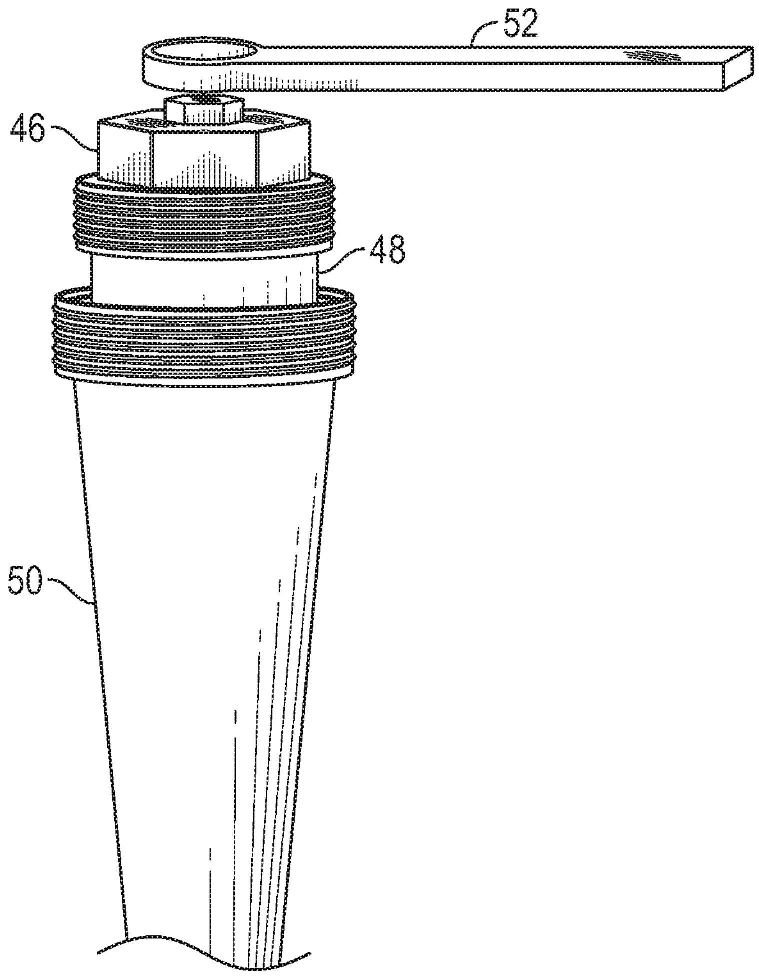
FIG. 8 is a side view of an implementation of a damper assembly containing a base valve where the base valve is connected to a base valve removal tool and a wrench is above the base valve removal tool.

Referring to FIG. 7, an implementation of wrench 44 with a closed end is illustrated. A wrench 44 may be used to turn the base valve removal tool to either remove or replace a base valve into a damper assembly of a motorcycle fork. Referring to FIG. 8, a base valve removal tool 46 is shown coupled with a base valve 48 inside a damper assembly 50. A wrench 52 is shown above the base valve removal tool 46. In various implementations, the wrench may engage with the base valve removal tool through corresponding shapes in the end of the wrench specific to the wrench and the removal tool. In various implementations, open ended wrenches may be employed as well. In other implementations, the wrench may be universal size/shape and the base valve removal tool may be correspondingly design to engage with the universal wrench while being sized for various brands of motorcycle forks. As illustrated in FIG. 8, a base valve removal tool 46 fits into the top of the base valve 48 and a wrench 52 or similar tool fits onto the top of the base valve removal tool 46. By turning a wrench 52, torque is applied to the base valve 48 through the base valve removal tool 46 causing the base valve 48 to screw into or out of the damper assembly 50.

Figure 9:
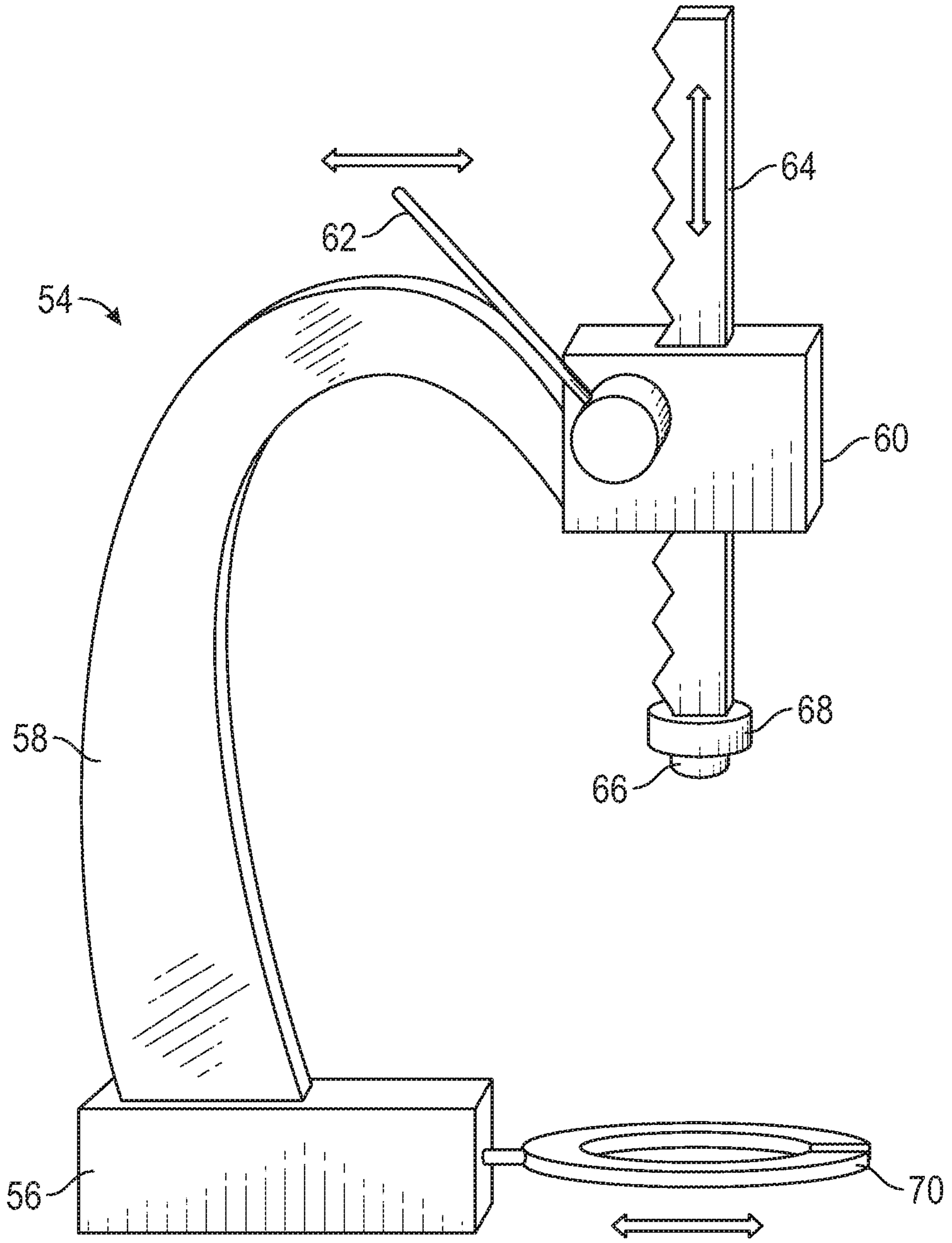
FIG. 9 is an implementation of a motorcycle base valve press.

Referring to FIG. 9, an implementation of a motorcycle base valve press 54 is illustrated. The motorcycle base valve press 54 includes a press base 56. The press base 56 may be coupled to a workbench or other structure to secure the motorcycle base valve press 54. As illustrated, the press base 56 is coupled to a first end of a press body 58. The second end of the press body 58 is coupled with a head 60 of the press. The press head 60 contains a mechanism that converts the rotational motion created by pulling or pushing a press handle 62 into the linear motion of the press ram 64. The press handle 62 may be moved using a horizontal motion as depicted by the horizontal arrow. The press ram 64 may move in a vertical motion as depicted by the vertical arrow. As illustrated, the press ram is coupled with a press ram end-cap 66. In this particular implementation, a thrust bearing 68 is coupled between the press ram 64 and press ram end-cap 66. The thrust bearing may allow the end cap 66 to turn with a base valve as will be described below. In various implementations, the end cap 66 may be coupled directly to the press ram 64. A motorcycle fork receiver 70 is coupled with the press base. In various implementations, the motorcycle fork receiver 70 may be used to hold and support parts of a motorcycle fork, such as the damper assembly, in a stationary position. The motorcycle fork receiver 70 may be moved predetermined distances toward the base and predetermined distances away from the base to fit varying sizes of motorcycle forks and related parts. The receiver may also be designed to tighten around the motorcycle fork as well in various implementations. The motorcycle fork receiver 70 may also be adjustable such that the items held in the motorcycle fork receiver 70 can be aligned with the center of the press ram 64 and press ram end-cap 66.

Figure 10:
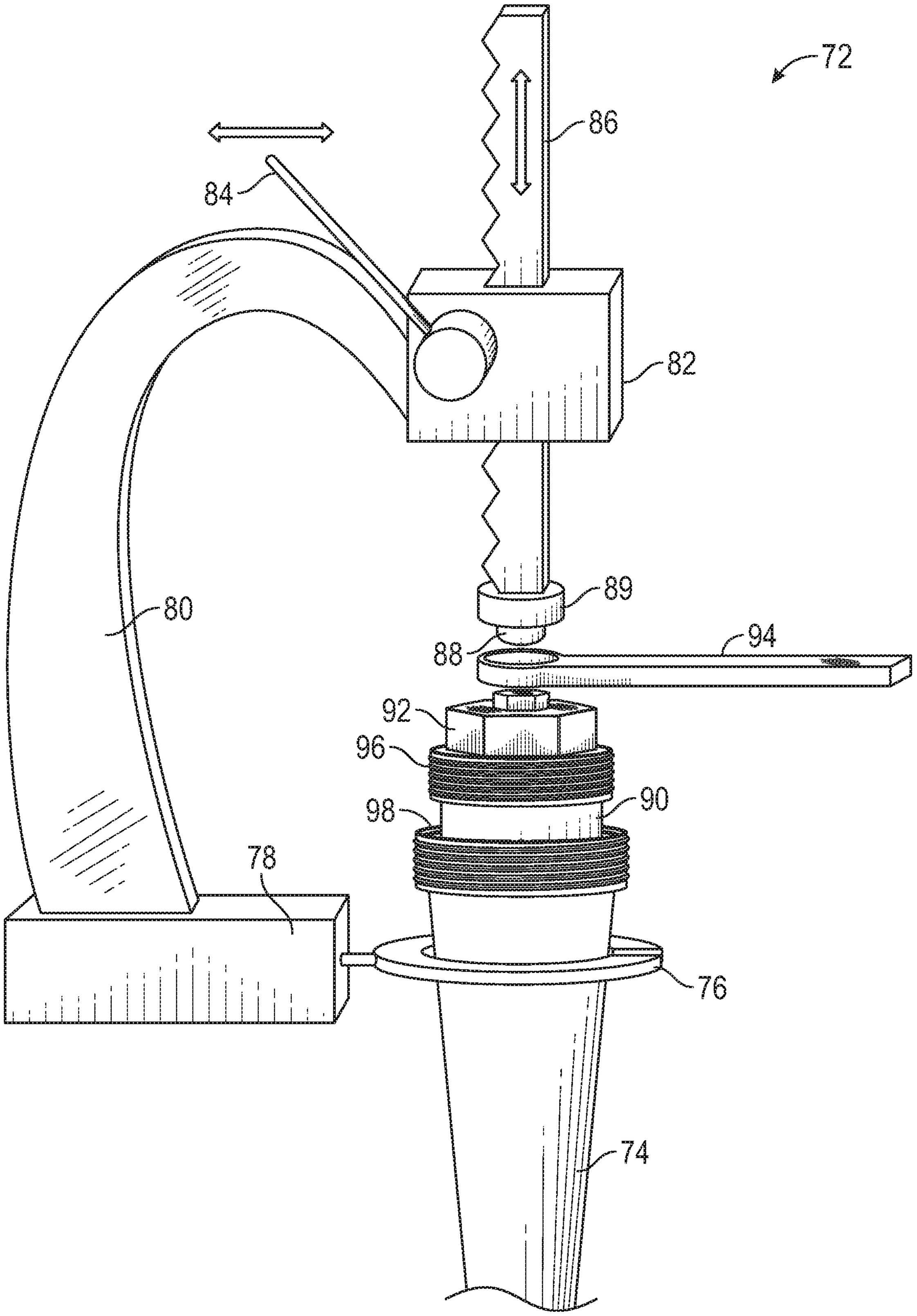
FIG. 10 is an implementation of a motorcycle base valve press holding a damper assembly.

Referring to FIG. 10, an implementation of a motorcycle base valve press 72 is illustrated. A damper assembly 74 is shown positioned in the motorcycle fork receiver 76 of the motorcycle base valve press 72. A method for coupling a base valve 90 of a motorcycle fork into a damper assembly 74 of a motorcycle fork may be performed using an implementation of a motorcycle base valve press 72. As illustrated, the motorcycle base valve press 72 including a base 78 coupled to a first end of a body 80. The base 78 may be secured to a workbench, wall, or other suitable, stable surface. The press include a head 82 coupled to a second end of the body 80. A handle 84 is coupled to a side of the head 82 and a press ram 86 is coupled through the head 82 as shown. An end cap 88 is coupled with a first end of the press ram 86. In this particular implementation, a thrust bearing 89 is coupled between the press ram 86 and end cap 88. In various implementations, a thrust bearing may be replaced by another device that allows the end cap to turn independently of the press ram, such as, by non-limiting example, a single diameter rod, a hemispherical shape, a rectangular shaped rod, a stepped rectangular rod, an elliptical rod, and any other shape capable of engaging with the end cap. In still other implementations, the press ram may be in direct contact with the end cap. The end cap may be used to protect items from being damaged by the press ram including, by non-limiting example, preventing scratches and dents in the various fork components.

To operate the motorcycle base valve press 72, a damper assembly 74 may be inserted into the motorcycle fork receiver 76. A base valve 90 may be placed inside the damper assembly 74 inside the motorcycle fork receiver 76. The motorcycle fork receiver 76 may be turned (tightened) to secure the damper assembly 74 within the motorcycle fork receiver 76. The damper assembly 74 may be held stationary relative to the motorcycle base valve press 72. As illustrated, a base valve removal tool 92 is coupled with the top of the base valve 90 and a wrench 94 is placed around/against the base valve removal tool 92. The press ram 86 is used to apply a force to the base valve 90 biasing the base valve 90 into the damper assembly. The handle 84 of the press is used to move the press ram 86 towards the wrench 94 and the base valve removal tool 92.

When the press end-cap 88 contacts the top of the wrench 94 and base valve removal tool 92, a user may continue to pull the press handle 84 forcing the wrench 94, base valve removal tool 92, and base valve 90 into the damper assembly 74. This action may continue until the threads 96 on the outside of the base valve 90 align with the threads 98 on the inside of the damper assembly 74. After the threads are aligned, the user maintains the position of the press handle 84 and then turns the wrench 94 causing the base valve removal tool 92 and base valve 90 to turn with respect to the damper assembly 74. The turning causes the threads, 96 and 98, to engage with one another and the base valve 90 to fasten into the damper assembly 74. A user then continues to turn the wrench until the threads, 96 and 98, have engaged sufficiently that they will not disengage on their own when pressure from the press ram 86 is released. Once the base valve is secured with the damper assembly, the operator can reverse the direction of the press handle 84 releasing the press end-cap 88 from contact with the wrench 94 and base valve removal tool 92. The operator may continue to turn the wrench 94 and base valve removal tool 92 until the base valve 90 is properly tightened into the damper assembly 74.

Because the press is used to apply the pressure, the user can focus on getting the threads aligned and then turning the wrench when they are aligned to get the base value screwed into the damper assembly 74. Also, because the fork is held still in the fork receiver while this process is going on and the base value can be held substantially flat relative to the face of the damper assembly, all of the components are optimally aligned for the process of tightening the threads during operation. This is in contrast with the conventional process which requires the user to hold the base valve against the top of the damper assembly by hand, a process which lacks the precision alignment capability of the press process.

Figure 11:
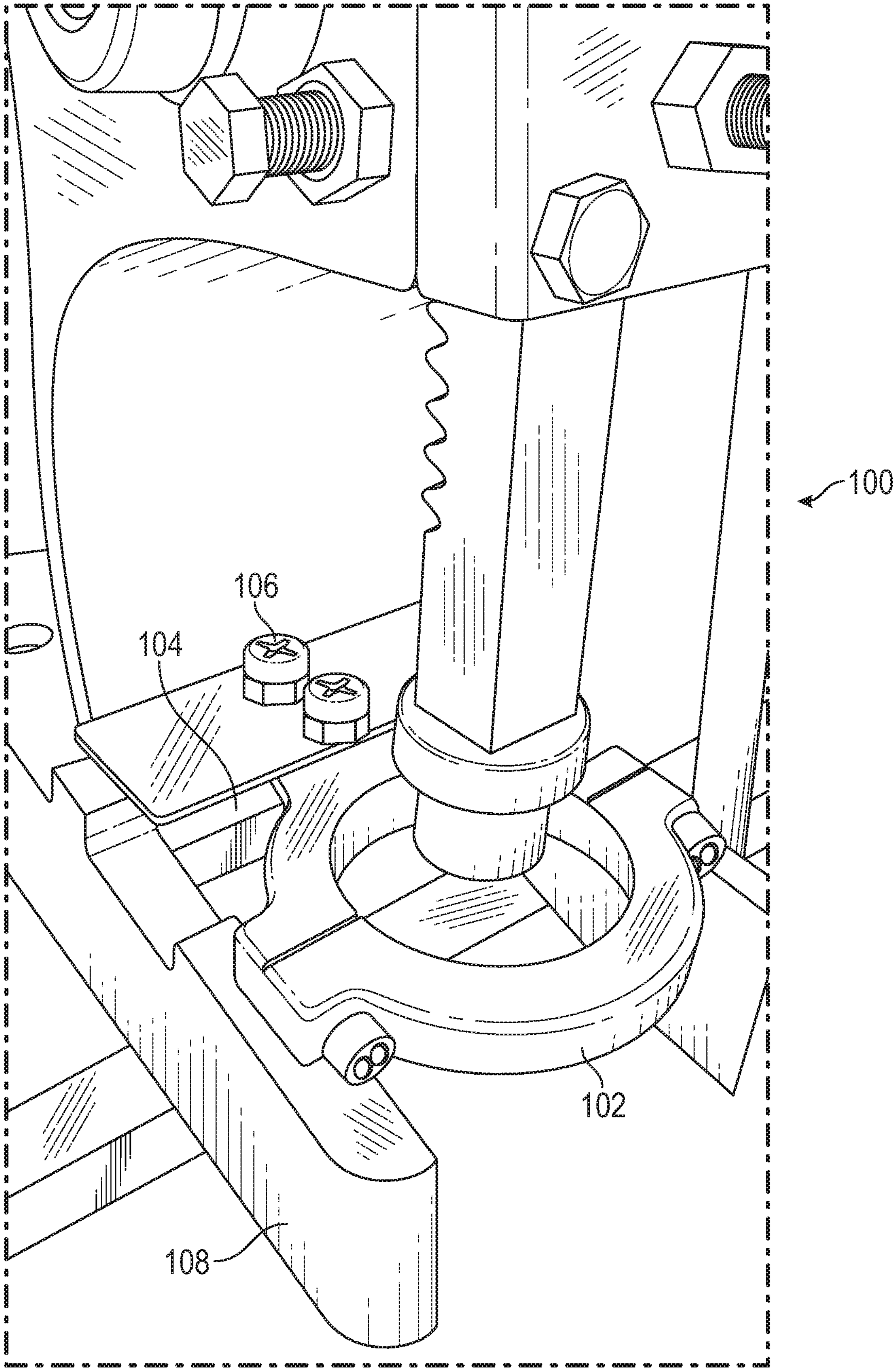
FIG. 11 is another implementation of a motorcycle base valve press.

Referring to FIG. 11, another implementation of a motorcycle base valve press 100 is illustrated. In this implementation, the motorcycle fork receiver 102 is coupled to the base 104 of the press 100 through two screws 106. In various implementations, other fasteners may be used. The motorcycle fork receiver 102 is also coupled to the press through two legs 108 extending from the base 104 of the press 100. The legs 108 may provide more support to the motorcycle fork receiver 102 in holding the damper assembly stationary. The receiver 102 also includes two half circular portions which are designed to screw together. Depending upon the size of the half circular portions, the diameter of the opening in the motorcycle fork receiver 102 can be adjusted to correspond with various motorcycle forks. In this way, the size of the motorcycle fork receiver can be manually changed rather than adjusted in various implementations.

In places where the description above refers to particular implementations of motorcycle base valve presses and implementing components, sub-components, methods and sub-methods, it should be readily apparent that a number of modifications may be made without departing from the spirit thereof and that these implementations, implementing components, sub-components, methods and sub-methods may be applied to other motorcycle base valve presses.

What is claimed is:

1. A motorcycle base valve press comprising:
- a press comprising a base coupled to a first end of a body, a head coupled to a second end of the body, a handle coupled to a side of the head, and a press ram coupled through an opening in the head, the head entirely encompassing that portion of the press ram coupled through the opening;
- an end cap coupled with a first end of the press ram; and
- a motorcycle fork receiver coupled to the base of the press, the motorcycle fork receiver configured to receive a damper assembly of a motorcycle fork;
- wherein the end cap is configured to contact a base valve of the damper assembly through the press ram and allow the base valve to turn.

2. The motorcycle base valve press of claim 1, further comprising a thrust bearing coupled between the press ram and the end cap.

3. The motorcycle base valve press of claim 2, wherein the thrust bearing is configured to allow the end cap to turn with the base valve using a wrench.

4. The motorcycle base valve press of claim 1, wherein the base is configured to couple to one of a workbench and a wall.

5. The motorcycle base valve press of claim 1, wherein the motorcycle fork receiver is configured to tighten around the damper assembly.

6. The motorcycle base valve press of claim 1, wherein the press ram is configured to move vertically in relation to the head of the press.

7. A motorcycle base valve press comprising:
- a press comprising a base coupled to a first end of a body, a head coupled to a second end of the body, a handle coupled to a side of the head, and a press ram coupled through an opening in the head, the head completely surrounding that portion of the press ram coupled through the opening;
- an end cap coupled with a first end of the press ram;
- a thrust bearing coupled between the press ram and the end cap; and
- a motorcycle fork receiver coupled to a base of the press;
- wherein the end cap is configured to contact a base valve of a motorcycle fork and allow the base valve to turn.

8. The motorcycle base valve press of claim 7, wherein the thrust bearing is configured to allow the end cap to turn with the base valve using a wrench.

9. The motorcycle base valve press of claim 7, wherein the base is configured to couple to a workbench.

10. The motorcycle base valve press of claim 7, wherein the motorcycle fork receiver is configured to tighten around a damper assembly.

11. The motorcycle base valve press of claim 7, wherein the press ram is configured to move vertically in relation to the head of the press.

12. A method for coupling a base valve into a damper assembly using a motorcycle base valve press, the method comprising:
- providing a press comprising:
  - a base coupled to a first end of a body, a head coupled to a second end of the body, a handle coupled to a side of the head, and a press ram coupled through the head;
  - an end cap coupled with a first end of the press ram; and
  - a motorcycle fork receiver coupled to a base of the press;
- inserting a damper assembly into the motorcycle fork receiver, the damper assembly coupled with a base valve of a motorcycle fork;
- placing a base valve removal tool on a top of the base valve;
- placing a wrench around the base valve removal tool;
- using the press ram to bias the base valve into the damper assembly;
- rotating the base valve using the wrench engaged around the base valve removal tool to tighten the base valve into the damper assembly a desired distance;
- releasing the bias of the press ram; and
- removing the damper assembly from the press.

13. The method of claim 12, further comprising tightening the motorcycle fork receiver around the damper assembly wherein the damper assembly is prevented from turning.

14. The method of claim 13, wherein the base is configured to couple to one of a workbench and a wall.

15. The method of claim 13, wherein the motorcycle fork receiver is configured to tighten around the damper assembly.

16. The method of claim 13, wherein the press ram is configured to move vertically in relation to the head of the press.

17. The method of claim 12, further comprising adjusting the motorcycle fork receiver by centering the ram and end cap over the base valve and the damper assembly.

18. The method of claim 12, further comprising aligning a plurality of threads on the base valve with a plurality of threads of the damper assembly.

19. The method of claim 12, wherein the press further comprises a thrust bearing coupled between the press ram and the end cap.

20. The method of claim 19, wherein the thrust bearing is configured to allow the end cap to turn with the base valve.

* * * * *